(12) United States Patent
Bedekar et al.

(10) Patent No.: US 8,160,067 B2
(45) Date of Patent: Apr. 17, 2012

(54) ADDRESS RESOLUTION PROTOCOL-BASED WIRELESS ACCESS POINT METHOD AND APPARATUS

(75) Inventors: Anand S. Bedekar, Arlington Heights, IL (US); Rajeev Agrawal, Northbrook, IL (US); Venkat Gopikanth, Buffalo Grove, IL (US); Suresh Kalyanasundaram, Bangalore (IN); Vishnu Ram Ov, Trivandrum (IN)

(73) Assignee: Motorola Mobility, Inc., Libertyville, IL (US)

( * ) Notice: Subject to any disclaimer, the term of this patent is extended or adjusted under 35 U.S.C. 154(b) by 843 days.

(21) Appl. No.: 11/913,940

(22) PCT Filed: Jun. 19, 2006

(86) PCT No.: PCT/US2006/023727
§ 371 (c)(1),
(2), (4) Date: Nov. 9, 2007

(87) PCT Pub. No.: WO2007/001949
PCT Pub. Date: Jan. 4, 2007

(65) Prior Publication Data
US 2008/0205362 A1    Aug. 28, 2008

(30) Foreign Application Priority Data
Jun. 21, 2005    (IN) .............................. 538/KOL/2005

(51) Int. Cl.
*H04L 12/56* (2006.01)
(52) U.S. Cl. ..................... 370/392; 370/397; 370/399
(58) Field of Classification Search .................. 370/349, 370/352, 389, 390, 392, 395.54; 709/242; 455/432.1–435.1
See application file for complete search history.

(56) References Cited

U.S. PATENT DOCUMENTS

| | | | |
|---|---|---|---|
| 5,506,838 | A  | 4/1996  | Flanagan |
| 6,195,555 | B1 | 2/2001  | Dent |
| 6,230,012 | B1 | 5/2001  | Willkie et al. |
| 6,285,880 | B1 | 9/2001  | Gagnon et al. |
| 6,430,698 | B1 | 8/2002  | Khalil et al. |
| 6,473,413 | B1 | 10/2002 | Chiou et al. |

(Continued)

FOREIGN PATENT DOCUMENTS

EP    0777396 A1    6/1997

(Continued)

OTHER PUBLICATIONS

Wikipedia Article from Internet: "Global System for Mobile Communications", Apr. 17, 2005,http://web.archive.org/web/20050417021658/http://de.wikipedia.org/wiki/Global_System_for_Mobile_Communications, Mar. 27, 2008, pp. 1-13.

(Continued)

*Primary Examiner* — Hassan Kizou
*Assistant Examiner* — Roberta A Shand

(57) ABSTRACT

A wireless access point (200), upon determining (101) that a need exists to support a communication need of a mobile station, acquires (102) a first Internet Protocol (IP) address and automatically transmits (103) a gratuitous Address Resolution Protocol message to a local router to thereby cause the latter to correlate the first IP address to a Medium Access Control address for the wireless access point. In a preferred embodiment the wireless access point can also automatically transmit a registration request to a remote network element (such as a Home Agent) that presents this first IP address as a care-of address to use in conjunction with another IP address that serves as a home address for the mobile station.

10 Claims, 2 Drawing Sheets

U.S. PATENT DOCUMENTS

| | | | |
|---|---|---|---|
| 6,567,664 | B1 | 5/2003 | Bergenwall et al. |
| 6,711,408 | B1 | 3/2004 | Raith |
| 6,721,565 | B1 | 4/2004 | Ejzak et al. |
| 6,795,857 | B1* | 9/2004 | Leung et al. .......... 709/224 |
| 6,795,891 | B2 | 9/2004 | Lin |
| 6,859,653 | B1 | 2/2005 | Ayoub et al. |
| 6,977,938 | B2 | 12/2005 | Alriksson et al. |
| 7,016,682 | B2* | 3/2006 | Won et al. .......... 455/445 |
| 7,096,273 | B1* | 8/2006 | Meier .......... 709/236 |
| 7,139,833 | B2 | 11/2006 | Heller |
| 7,289,463 | B2* | 10/2007 | Ozugur .......... 370/328 |
| 7,336,670 | B1* | 2/2008 | Calhoun et al. .......... 370/401 |
| 7,349,380 | B2* | 3/2008 | Barker et al. .......... 370/349 |
| 7,450,544 | B2* | 11/2008 | Rue .......... 370/331 |
| 7,512,687 | B2 | 3/2009 | Jung |
| 7,649,866 | B2* | 1/2010 | Chari et al. .......... 370/331 |
| 7,733,829 | B2* | 6/2010 | Lee et al. .......... 370/331 |
| 7,860,067 | B2 | 12/2010 | Na et al. |
| 2001/0024443 | A1 | 9/2001 | Alriksson et al. |
| 2002/0015396 | A1 | 2/2002 | Jung |
| 2002/0034166 | A1 | 3/2002 | Barany et al. |
| 2002/0057657 | A1 | 5/2002 | LaPorta et al. |
| 2002/0075844 | A1 | 6/2002 | Hagen |
| 2002/0094813 | A1 | 7/2002 | Koshimizu et al. |
| 2003/0016655 | A1* | 1/2003 | Gwon .......... 370/352 |
| 2003/0018810 | A1 | 1/2003 | Karagiannis et al. |
| 2003/0076837 | A1* | 4/2003 | Whitehill et al. .......... 370/395.4 |
| 2003/0104813 | A1 | 6/2003 | Julka et al. |
| 2003/0148777 | A1 | 8/2003 | Watanabe et al. |
| 2003/0174709 | A1 | 9/2003 | Shankar |
| 2003/0202505 | A1* | 10/2003 | Ozugur .......... 370/352 |
| 2003/0235176 | A1 | 12/2003 | Zhang et al. |
| 2004/0005884 | A1 | 1/2004 | Nieminen et al. |
| 2004/0022212 | A1 | 2/2004 | Chowdhury et al. |
| 2004/0023653 | A1 | 2/2004 | O'Neill |
| 2004/0034705 | A1 | 2/2004 | Focsaneanu |
| 2004/0043791 | A1 | 3/2004 | Reddy |
| 2004/0063455 | A1* | 4/2004 | Eran et al. .......... 455/525 |
| 2004/0066760 | A1 | 4/2004 | Thubert et al. |
| 2004/0071109 | A1 | 4/2004 | Herle et al. |
| 2004/0082330 | A1 | 4/2004 | Marin |
| 2004/0114559 | A1 | 6/2004 | Wang |
| 2004/0133684 | A1 | 7/2004 | Chan et al. |
| 2004/0185852 | A1 | 9/2004 | Son et al. |
| 2004/0213181 | A1 | 10/2004 | Grech et al. |
| 2004/0213260 | A1 | 10/2004 | Leung et al. |
| 2004/0242233 | A1 | 12/2004 | Lutgen |
| 2005/0047399 | A1 | 3/2005 | Lee et al. |
| 2005/0088994 | A1 | 4/2005 | Maenpaa et al. |
| 2005/0113091 | A1 | 5/2005 | Rodriguez et al. |
| 2005/0122946 | A1 | 6/2005 | Won |
| 2005/0128975 | A1 | 6/2005 | Kobayashi et al. |
| 2005/0135422 | A1* | 6/2005 | Yeh .......... 370/474 |
| 2005/0148368 | A1 | 7/2005 | Scheinert et al. |
| 2005/0163080 | A1 | 7/2005 | Suh et al. |
| 2005/0180372 | A1 | 8/2005 | Cho et al. |
| 2005/0185632 | A1 | 8/2005 | Draves, Jr. et al. |
| 2005/0213546 | A1 | 9/2005 | Reitter et al. |
| 2006/0104247 | A1 | 5/2006 | Dommety et al. |
| 2006/0112183 | A1 | 5/2006 | Corson et al. |
| 2006/0142034 | A1 | 6/2006 | Wentink et al. |
| 2006/0193272 | A1* | 8/2006 | Chou et al. .......... 370/310 |

FOREIGN PATENT DOCUMENTS

| | | |
|---|---|---|
| EP | 1404143 A2 | 3/2004 |
| EP | 1263182 B1 | 12/2008 |
| WO | 0045560 | 8/2000 |
| WO | 03049377 A1 | 6/2003 |
| WO | 2004073324 A2 | 8/2004 |
| WO | 2004073325 A2 | 8/2004 |

OTHER PUBLICATIONS

Chuan, M.C. et al.: Mobile Virtual Private Dial-up Services:, Bell Labs Technical Journal; Bell Laboratories; U.S., vol. 4, No. 3, Jul. 1999, pp. 51-72.

Perkins, Charles et al: "IMHP: A Mobile Host Protocol for the Internet", in Proceedings of INET'94/JENC5, (1994), all pages.

Wu, Chun-Hsin et al.: "Bi-direction Route Optimization in Mobile IP over Wireless LAN", Vehicular Technology Conference, 2002, Proceedings. VTC 2002-Fall, 2002 IEEE 56th, all pages.

Perkins, C: "IP Mobility Support for IPv4", Network Working Group, Request for Comments: 3344, Nokia Research Center, Aug. 2002, all pages.

R. Caceres and V.N. Padmanbhan: "Fast and Scalable Wireless Handoffs in Support of Mobile Internet Audio", ACM J. Mobile Net. and Appl., v3, No. 4, Dec. 1998, all pages.

Gustafsson Eva et al.: "Mobile IPv4 Regional Registration", draft-ietf-mobileip-reg-tunnel-09.txt, Mobile IP Working Group Internet Draft, Jun. 25, 2004, all pages.

Ericsson, "low Latency Handoffs in Mobile IPv4", Network Working Group, Internet-Draft, Expires Dec. 2004, Jun. 2004, draft-ietf-mobileip-lowlatency-handoffs-v4-09.txt, all pages.

Soliman, Hesham et al.: Hierarchical Mobile IPv6 Mobility management (HMIPv6), draft-ietf-mipshop-hmipv6-03.txt, Network Working Group, Expires: Apr. 2005, Oct. 2004, all pages.

Fathi, Hanane et al.: "Mobility Management for VoIP in 3G Systems: Evaluation of Low-Latency Handoff Schemes", IEEE Wireless Communications, Apr. 2005, 1536-1284/05, pp. 96-104.

Perkins, C: "IP Mobility Support", Network Working Group, Request for Comments: 2002 IBM, Oct. 1996, all pages.

Translation of the Official Communication from the German Patent and Trademark Office date Aug. 19, 2011, all pages.

* cited by examiner

ADDRESS RESOLUTION PROTOCOL-BASED WIRELESS ACCESS POINT METHOD AND APPARATUS

RELATED APPLICATIONS

This application relates to the following patent applications as were filed on even date herewith (wherein the contents of such patent applications are incorporated herein by this reference):

METHOD AND APPARATUS TO FACILITATE COMMUNICATIONS USING SURROGATE AND CARE-OF INTERNET PROTOCOL ADDRESSES Ser. No. 11/913, 939;

METHOD AND APPARATUS FOR REDUCING LATENCY DURING WIRELESS CONNECTIVITY CHANGES Ser. No. 11,913,936;

METHOD AND APPARATUS TO FACILITATE MOBILE STATION COMMUNICATIONS USING INTERNET PROTOCOL-BASED COMMUNICATIONS Ser. No. 11/913, 944;

METHOD, APPARATUS, AND SYSTEM FOR ESTABLISHING A DIRECT ROUTE BETWEEN AGENTS OF A SENDER NODE AND A RECEIVER NODE Ser. No. 11/913,935;

SYSTEM AND METHOD FOR PROVIDING A DISTRIBUTED VIRTUAL MOBILITY AGENT Ser. No. 11/913,937; and SYSTEM AND METHOD FOR PAGING AND LOCATION UPDATE IN A NETWORK Ser. No. 11/913,942.

TECHNICAL FIELD

This invention relates generally to communication systems and more particularly to communication systems that support wireless mobility and changes with respect to corresponding wireless connectivity.

BACKGROUND

One-way and two-way wireless communications are a relatively well-understood area of endeavor. In many cases, various network elements comprise an infrastructure that support the communications needs of one or more mobile stations. These communications needs can comprise voice calls, data communications, and so forth. In many cases, modern communications networks comprise a large number of geographically differentiated wireless access points that essentially define the network's edge. Such geographic differentiation, in turn, facilitates significant reuse of various network resources such as radio frequency bearer channels, control channels, time slots, spreading codes, and so forth. Aggressive reuse of such resources then facilitates viably supporting a relatively large user population.

Such communication networks often serve to support the communication needs of mobile users as those mobile users move with respect to the communication system infrastructure. This, however, gives rise to a need to support various mobility management functions such as, but not limited to:

Connected mode mobility (for example, handover of a presently communicating mobile station from one wireless access point to another);

Idle mode mobility (for example, supporting and effecting location updates for and/or paging of supported mobile stations);

Subscriber and call session management (for example, authentication, authorization, and accounting services, policy administration, and so forth);

Radio frequency resource management (for example, resource scheduling, admission control, dynamic quality of service management, load balancing, and so forth);

to name but a few.

There are various problems and concerns that arise when supporting such mobility management capabilities. For example, the infrastructure must remain current with respect to a given mobile station's present point of attachment to the system in order to ensure that data packets intended for that mobile station arrive in a timely manner. Unfortunately, as mobility management requirements are tending to grow, so, to, grows infrastructure complexity (including but not limited to hierarchical differentiation and network element layering). As a result, maintaining an increasing quantity of mobility management information within an increasingly complex infrastructure often requires significant internal resources and can even introduce limits with respect to how large a given system architecture might be otherwise scaled.

BRIEF DESCRIPTION OF THE DRAWINGS

The above needs are at least partially met through provision of the Address Resolution Protocol-based wireless access point method and apparatus described in the following detailed description, particularly when studied in conjunction with the drawings, wherein.

Figure 2:
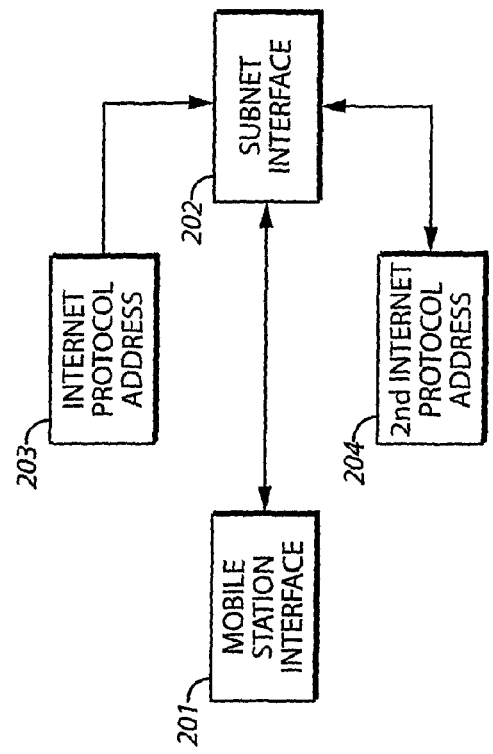
FIG. 2 comprises a block diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the arts will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein. For example, as used herein, the expression "Internet Protocol" will be readily understood to refer to any presently existing or hereafter developed Internet protocol including, but not limited to, IPv4 and IPv6.

DETAILED DESCRIPTION

Generally speaking, pursuant to these various embodiments, upon determining a need to support a communication need of a mobile station (as when, for example, that mobile station becomes attached pursuant to an initial attachment to the communication system or when some other mobility management event occurs), a corresponding wireless access point can acquire a first Internet Protocol address and automatically transmit a gratuitous address resolution protocol-like message (e.g. ARP) message (with similar protocols also being known in some instances as neighbor discovery) to a router that shares a same subnet as the wireless access point to thereby cause the router to correlate and bind that first Internet Protocol address to a link layer (Medium Access Control (MAC)) address for the wireless access point. That first Internet Protocol address can then be used to facilitate effecting a redirection of data intended for eventual delivery to the mobile station to that first Internet Protocol address.

Pursuant to one approach, that first Internet Protocol address can comprise an Internet Protocol address acquired, for example, from a local Dynamic Host Configuration Protocol (DHCP) server. Pursuant to another approach, the first Internet Protocol address can be acquired from a second wireless access point (as may be appropriate, for example, when the mobile station is being handed-over to the wireless access point from that second wireless access point).

Pursuant to a preferred approach, using the first Internet Protocol address to facilitate redirecting data for the mobile station can further comprise automatically transmitting a registration request to a network element (such as an intermediate or home-subnet Home Agent) that is remote to the subnet via the aforementioned router. That registration request can present a second Internet Protocol address as a home address and the first Internet Protocol address as a care-of address to thereby facilitate effecting the described redirection. The source and nature of this second Internet Address can vary with the needs and/or capabilities of a given system and/or mobile station.

For example, when the mobile station comprises an Internet Protocol-capable platform, this second Internet Protocol address can comprise the mobile station's own Internet Protocol address. As another example, the second Internet Protocol address may comprise yet another surrogate Internet Protocol address as may be acquired by the wireless access point on behalf of the mobile station.

These teachings are readily applicable or use with respect to a wide variety of mobility management events, including, for example, handovers, new connection activations, paging events, location update messages, and so forth. Those skilled in the art will appreciate that these teachings yield a session context where constant mobility management event-driven location/address updates throughout a communication system hierarchy can be avoided in many instances. For example, so configured, when next shifting to another wireless access point as shares the same subnet that comprises the aforementioned wireless access point, only the tunnel context between the new wireless access point and the router need be updated; the previously established packet forwarding context as exists between, for example, the previously mentioned remote network element and the router itself can remain intact as the router will now be able to correlate the already-established addressing information with the newly-established addressing context.

Those skilled in the art will also understand and appreciate that the indicated usage of an Address Resolution Protocol message allows a leveraged use of this already-existing capability beyond that ordinarily contemplated. This, in turn, avoids a need for new messaging capability and/or message formats and therefore permits deployment of these teachings within existing network architectures with fewer modifications and/or platform upgrades. These teachings also permit greater upward scalability with respect to extending network hierarchy as such increased layering and relative complexity will not now always require a commensurate increase in tunnel creation and tear-downs with every mobility management event as may be experienced by a given mobile station.

Figure 1:
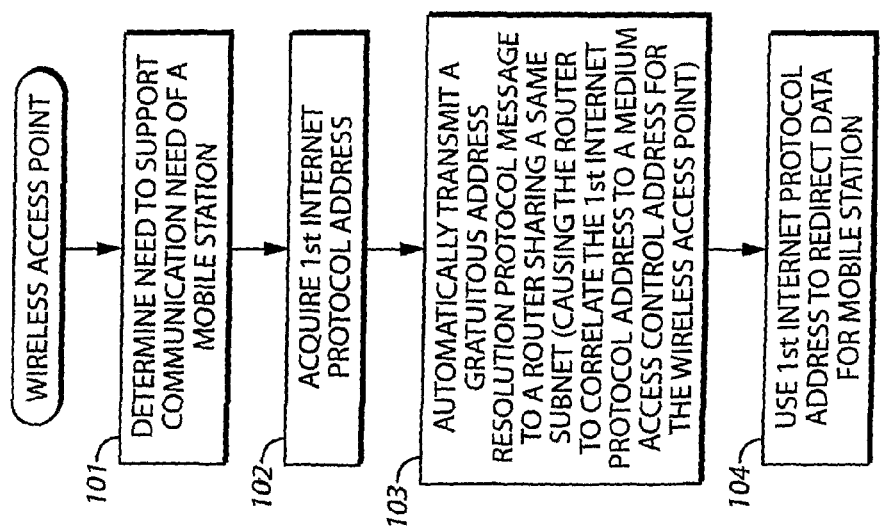
FIG. 1 comprises a flow diagram as configured in accordance with various embodiments of the invention.

These and other benefits may become clearer upon making a thorough review and study of the following detailed description. Referring now to the drawings, and in particular to FIG. 1, these concepts are perhaps best understood by first understanding how a wireless access point can act in facilitation thereof. (As used herein, "wireless access point" will be understood to comprise both a mobile station interface, such as a wireless base station, and a mobility agent such as a Foreign Agent. As such elements are otherwise well understood in the art, further elaboration will not be provided here for the sake of brevity and clarity.)

Pursuant to a preferred process 100, a wireless access point will first determine 101 a need to support at least one communication need of a mobile station. This can comprise, for example, detecting a mobility management event for the mobile station with respect to that wireless access point. These teachings are compatible with a wide variety of presently known and likely hereafter-developed mobility management events including, but not limited to:

a handover of the mobile station from the wireless access point;

a handover of the mobile station to the wireless access point;

activation of a new connection to the wireless access point;

sending a page to the mobile station;

receiving a paging response from the mobile station; and receiving a location update message from the mobile station;

to name a few. The step of detection can itself be accomplished using any of a variety of existing triggering and/or monitoring facilities as are known in the art and as will be well-understood by those skilled in the art.

Upon making this determination 101, the wireless access point can then respond, at least in part, by acquiring 102 a first Internet Protocol address. This first Internet Protocol address is preferably going to serve as a surrogate address for the mobile station (as will become more clear below) and may be obtained, for example, from a local subnet resource such as a Dynamic Host Configuration Protocol server as is known in the art. This approach may be preferred, for example, when supporting a first attachment of the mobile station to the local subnet.

In other cases, it may be preferred to acquire this first Internet Protocol address from another source. For example, when a second wireless access point for this local subnet has already acquired a surrogate Internet Protocol address for this mobile station, it may be beneficial to simply transfer that existing surrogate Internet Protocol address from the second wireless access point to the present wireless access point via, for example, a peer-to-peer communication using the communication resources of the local subnet. Other sources for the first Internet Protocol address may be used when and as appropriate to the needs of a given application setting.

Upon acquiring 102 this first Internet Protocol address, the wireless access point will then preferably automatically transmit 103 a gratuitous address resolution protocol message-like message (which may include, for example, a neighbor discovery protocol message or other similar protocol and/or message that serves to facilitate binding an Internet Protocol address to a link layer address) to a router that shares the same subnet as the wireless access point itself. The term "gratuitous" is intended to signify and indicate that the wireless access point sources this ARP message in the absence of a specific communication from the mobile station to convey such a message as would more ordinarily characterize the use of such a message in the prior art. Instead, The wireless access point, by these teachings, is preferably configured and arranged to source this ARP message as an automatic response to detecting the mobile station communication need and then acquiring the first Internet Protocol address.

The Address Resolution Protocol message will, of course, include and present the Medium Access Control address of the wireless access point itself as will be understood by those skilled in the art. As a result, upon receiving this Address Resolution Protocol, the router will automatically correlate and bind the first Internet Protocol address to the (Medium Access Control) link layer address of the wireless access point in accordance with existing practice. The benefit of this correlation will be made clearer below. In the meantime, those skilled in the art will understand and appreciate that no special additional programming will ordinarily be required to ensure this response by the router as the described response comprises the ordinary response of such a router to such an Address Resolution Protocol message.

These preceding steps now permit the wireless access point to use 104 the first Internet Protocol address to facilitate subsequent redirection of the data intended for eventual delivery to the mobile station to that first Internet Protocol address (wherein the first Internet Protocol address will be understood to preferably serve as a surrogate address for the mobile station).

This usage step 104 can take various forms to accommodate the needs and/or the requirements and limitations of a given application setting. In a preferred approach, such usage can comprise, at least in part, automatically transmitting a registration request to a network element that is remote to the subnet via the router. This network element can comprise, for example, a Home Agent (such as a hierarchically intermediate Home Agent or the Home Agent for the mobile station's home subnet). The registration request itself can comprise, for example, a Mobile Internet Protocol registration request as is known in the art.

By automatically transmitting one or more such registration requests to one or more such network elements the wireless access point can establish the above-indicated acquired surrogate Internet Protocol address as a care-of address to use when forwarding data packets intended for the mobile station to a home Internet Protocol address for that mobile station. Upon receiving such a data packet, the router can, in turn, utilize its information that binds the MAC address for the wireless access point to that care-of address to forward the data packet to the wireless access point. And, upon receiving such a forwarded data packet, the wireless access point can use its own information correlating the acquired surrogate Internet Protocol address (and/or the "home" address which may, or may not, correlate directly to the mobile station) to the mobile station to thereby identify the final destination for the packet.

Such a process can be readily supported using any of a wide variety of enabling wireless access point platforms including dedicated purpose platforms and those that are partially or wholly programmable. FIG. 2 provides a view of at least some useful components of such a wireless access point 200. In a preferred approach the wireless access point 200 comprises a mobile station interface 201 (such as a wireless base station of choice) and a subnet interface 202. This subnet interface 202 serves, in a preferred approach, to provide the mechanism for effecting the above-described actions of acquiring a surrogate Internet Protocol address from the local subnet from a local resource such as a Dynamic Host Configuration Protocol server (and/or from another wireless access point as comprises a part of that subnet). This subnet interface 202 also serves, in a preferred configuration, to effect the automatic transmission of the gratuitous Address Resolution Protocol message to the router as described above.

This particular illustrative embodiment of a wireless access point 200 also depicts storage facilities for an Internet Protocol address 203 as corresponds to a given mobile station and the aforementioned second Internet Protocol address 204 (i.e., the above-mentioned surrogate Internet Protocol address). The first-mentioned Internet Protocol address 203 can comprise, for example, an Internet Protocol address as may be provided by the mobile station itself when the latter comprises an Internet Protocol-capable and/or a Mobile Internet Protocol-capable element. In the alternative, if desired, this Internet Protocol address 203 can also comprise an address that has been acquired by the wireless access point 200 on behalf of the mobile station.

So configured, a wireless access point can readily support the teachings presented above. In particular, the wireless access point can acquire the suggested Internet Protocol addresses and effect the automated transmissions to the router and/or other network elements as described. The wireless access point will also have the necessary resources to facilitate the proper routing of data packets as have been received via the router in response to these actions.

Figure 3:
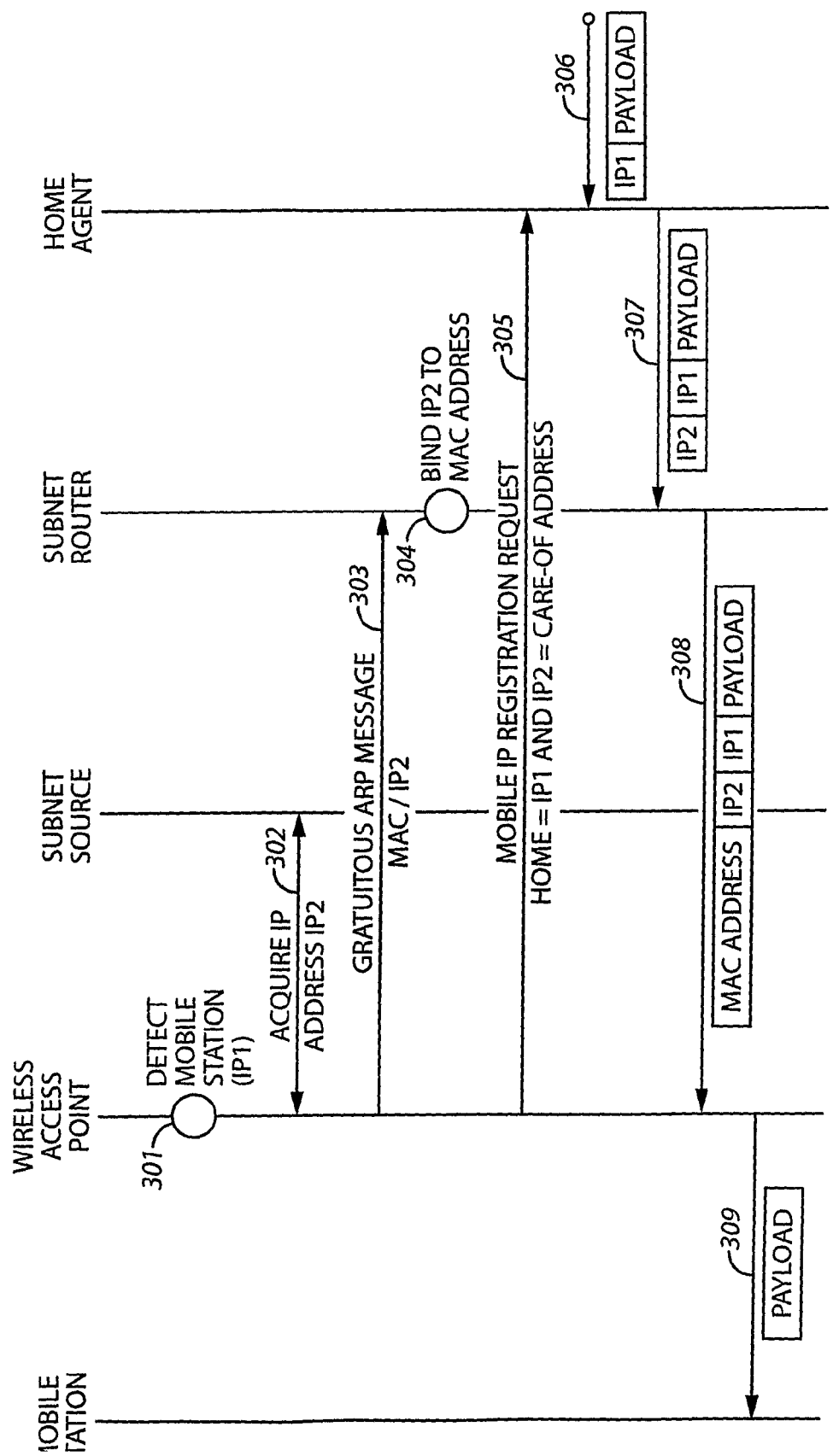
FIG. 3 comprises a signal flow diagram as configured in accordance with various embodiments of the invention.

Referring now to FIG. 3, an illustrative scenario will be provided to aid in understanding the benefits and applicability of these teachings. Those skilled in the art will understand and appreciate that this illustrative scenario is non-exhaustive and comprises only one of many possible scenarios. It will therefore also be understood that these teachings have considerably broader application than the limits of a specific example such as that now described might otherwise suggest on its face.

In this illustrative scenario, a wireless access point detects 301 a given mobile station (as per any of a wide variety of mobility management events, for example), which has a previously assigned first Internet Protocol Address IP1. The wireless access point next communicates 302 with a local subnet source (such as another wireless access point, a Dynamic Host Configuration Protocol server, and so forth) to acquire another Internet Protocol address IP2 that the wireless access point will employ as a surrogate address for the mobile station.

The wireless access point then preferably transmits a gratuitous Address Resolution Protocol message 303 to a local subnet router. This message 303 presents both the surrogate Internet Protocol address IP2 and the Medium Access Control address for the wireless access point itself. The subnet router then binds 304 this Internet Protocol address IP2 to the Medium Access Control address in accord with its ordinary and customary functionality.

In this example, the wireless access point next transmits a Mobile Internet Protocol registration request 305 to another network element comprising, in this example, a mobility management agent (such as a Home Agent) in a home subnet as corresponds to the mobile station. This registration request 305 presents the IP1 address as a home address for the mobile station and the IP2 address as a care-of address. Accordingly, when that Home Agent later receives a data packet 306 bearing the IP1 address, the Home Agent will now tunnel that data packet to the subnet router using the IP2 care-of address 307. The latter, in turn, will correlate that IP2 address to the previously bound Medium Access Control address for the wireless access point and use that Medium Access Control address to forward the packet 308 to the wireless access point. The wireless access point will now use its information to decapsulate the packet, identify the proper final destination (i.e., the mobile station), and forward that packet 309 to the mobile station via its mobile station interface.

Those skilled in the art will understand and appreciate that these actions are largely the result, in many instances, of already existing programmed responses and/or further leveraging of already existing requests and messages. It will also be appreciated that, so deployed, further movement of the mobile station within the present subnet can be readily supported without necessarily requiring the establishment of tunnels in each instance up to and including the described Home Agent. Instead, when the surrogate IP2 address is transferred to a next wireless access point as receives the mobile station via a hand over, the next wireless access point need only transmit its own gratuitous Address Resolution Protocol message to the router to cause the latter to now bind that surrogate IP2 address to its own Medium Access Control address. The Home Agent, in such a scenario, can simply continue to use the IP1 and IP2 addresses when forwarding packets to the mobile station and the local router will effect proper routing notwithstanding that the mobile station has become attached to a different wireless access point.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for routing data comprising:
   determining a need to support at least one communication need of a mobile station;
   acquiring, by a first wireless access point of a subnet that comprises a plurality of wireless access points, a first Internet Protocol address used in association with the mobile station by a second wireless access point of the plurality of wireless access points;
   automatically transmitting, by the first wireless access point, a gratuitous Address Resolution Protocol message to a router that shares the same subnet as the wireless access point, to thereby cause the router to correlate the first Internet Protocol address to a Medium Access Control address for the first wireless access point;
   automatically transmitting a registration request to a network element that is remote to the subnet, wherein the registration request presents a second Internet Protocol address as a home address for the mobile station and the first Internet Protocol address as a care-of-address for the mobile station for use by the network element to route data to the mobile station;
   receiving, by the first wireless access point from the router and using the Medium Access Control address, data intended for eventual delivery to the mobile station.

2. The method of claim 1 further comprising:
   receiving, by the router from the network element, the data intended for eventual delivery to the mobile station and addressed to the first Internet Protocol address;
   routing, by the router, the data intended for eventual delivery to the mobile station using the Medium Access Control address of the first wireless access point.

3. The method of claim 2 further comprising:
   receiving via the subnet a communication bearing the second Internet Protocol address;
   forwarding at least a portion of the communication to the mobile station.

4. The method of claim 1 wherein:
   determining a need to support at least one communication need of a mobile station comprises detecting a mobility management event for the mobile station with respect to the wireless access point; and
   acquiring a first Internet Protocol address comprises receiving the first Internet Protocol address from another wireless access point.

5. A wireless access point comprising:
   a mobile station interface;
   an Internet Protocol address that corresponds to a given mobile station that interfaces with the wireless access point via the mobile station interface;
   a second Internet Protocol address that the wireless access point acquired via a subnet interface and was used in association with the given mobile station by another wireless access point of the same subnet as the wireless access point, which second Internet Protocol address the wireless access point associates with the given mobile station;
   a subnet interface configured and arranged to transmit to a router that shares a same subnet as the wireless access point an Address Resolution Protocol message to thereby cause the router to correlate the second Internet Protocol address to a Medium Access Control address for the wireless access point and to receive, from router and intended for the given mobile station, data routed using the Medium Access Control address;
   means for transmitting a registration request to a network element that is remote to the subnet, wherein the registration request presents the Internet Protocol address as a home address for the mobile station and the second Internet Protocol address as a care-of-address for the mobile station; and
   wherein the wireless access point forwards the data received from the router to the given mobile station via the mobile station interface and using the Internet Protocol address that corresponds to the given mobile station.

6. The wireless access point of claim 5 wherein the subnet interface comprises means for acquiring the second Internet Protocol address from the subnet.

7. The wireless access point of claim 5 wherein the subnet interface comprises means for acquiring the second Internet Protocol address from one or more of another wireless access point as comprises a part of the subnet and from a Dynamic Host Configuration Protocol server.

8. The wireless access point of claim 5 wherein the subnet interface further comprises means for automatically transmitting a gratuitous Address Resolution Protocol message to the router to thereby cause the router to correlate the second Internet Protocol address to a Medium Access Control address for the wireless access point.

9. A method to facilitate communications via a communication system that comprises, in part, a subnet that itself comprises a plurality of wireless access points, the method comprising:
   at a first one of the wireless access points:
      detecting a mobile station;
      acquiring a local Internet Protocol address from a subnet source to use in correspondence with the mobile station, wherein the local Internet Protocol address is used in association with the mobile station by a second wireless access point of the plurality of wireless access points;
      transmitting a gratuitous Address Resolution Protocol message bearing the local Medium Access Control address and another Internet Protocol address that corresponds to the mobile station to a subnet router;

transmitting a registration request to a network element that is remote to the subnet, wherein the registration request presents the another Internet Protocol address as a home address for the mobile station and the local Internet Protocol address as a care-of-address for the mobile station;

at the subnet router:

receiving the gratuitous Address Resolution Protocol message;

correlating the local Internet Protocol address with a Medium Access Control address for the first one of the wireless access points;

receiving, from the network element that is remote to the subnet, a communication intended for the mobile station and bearing the local Internet Protocol address and the another Internet Protocol address;

using the local Internet Protocol address from the communication to identify the Medium Access Control address as correlates thereto;

using the identified Medium Access Control address to forward the communication to the first one of the wireless access points;

at the first one of the wireless access points:

receiving the communication as forwarded by the subnet router;

using the another Internet Protocol address to identify the mobile station; and forwarding the communication to the mobile station.

10. The method of claim 9 wherein acquiring a local Internet Protocol address from a subnet source to use in correspondence with the mobile station comprises receiving the local Internet Protocol address from one or more of a local Dynamic Host Configuration Protocol server and another wireless access point.

* * * * *